United States Patent [19]

Hutchinson

[11] 4,425,206
[45] Jan. 10, 1984

[54] ANHYDROUS PROCESS FOR PREPARING AMORPHOUS CHLORINATED POLYETHYLENE AND PRODUCT THEREOF

[75] Inventor: Loyd B. Hutchinson, Denham Springs, La.

[73] Assignee: The Dow Chemical Company, Midland, Mich.

[21] Appl. No.: 448,119

[22] Filed: Dec. 9, 1982

[51] Int. Cl.$^3$ .................................................. C08F 8/22
[52] U.S. Cl. ............................ 204/159.18; 525/333.8; 525/334.1; 525/356
[58] Field of Search .................... 204/159.18; 525/356

[56] References Cited

U.S. PATENT DOCUMENTS

| | | | |
|---|---|---|---|
| 2,890,213 | 6/1959 | Noeske | 204/159.18 |
| 2,928,819 | 3/1960 | Noeske | 525/356 |
| 3,033,845 | 5/1962 | Scott | 525/356 |
| 3,759,888 | 9/1973 | Nose et al. | 525/356 |
| 4,029,862 | 6/1977 | Liu et al. | 525/356 |
| 4,197,386 | 4/1980 | Schoen | 525/356 |

Primary Examiner—Joseph L. Schofer
Assistant Examiner—Bernard Lipman
Attorney, Agent, or Firm—D. R. Howard

[57] ABSTRACT

Amorphous, chlorinated ethylene polymers which have relatively low blocking tendencies in the absence of antiblock additives are prepared in a multi-step process. The process involves reacting porous, solid, finely divided, high density polyethylene particles with gaseous chlorine in the presence of a free radical initiator while said particles are agitated or maintained in a fluidized bed state. In a first step, addition of gaseous chlorine is started while the agitated particles are at a temperature of less than about 50° Centigrade. Little, if any, chlorination takes place in the first step. In a second step, the agitated particles are chlorinated to a level of from about 5 to about 14 percent while the temperature of said particles is increased to a temperature within a temperature range of from about 50° Centigrade to about 105° Centigrade. Chlorination of the agitated particles is continued in a third step wherein the temperature of said particles is increased at a certain rate up to a temperature of from about 125° Centigrade to about 132° Centigrade. Chlorination of the agitated particles is completed in a fourth step while the temperature of said particles is increased to a temperature in excess of about 130° Centigrade but less than that temperature at which the particles tend to agglomerate. The fourth step is continued until a percent residual relative crystallinity of less than about 2 percent is obtained and a desired chlorine content is achieved. Illustrative chlorine contents are from about 30 to about 42 percent by weight of chlorinated polymer.

12 Claims, No Drawings

ANHYDROUS PROCESS FOR PREPARING AMORPHOUS CHLORINATED POLYETHYLENE AND PRODUCT THEREOF

BACKGROUND OF THE INVENTION

The present invention relates to a process for the manufacture of amorphous chlorinated polyethylene. More particularly, the present invention relates to an anhydrous process for preparing amorphous chlorinated polyethylene.

Various processes for chlorinating olefin polymers in general and ethylene polymers in particular are known. The processes can generally be distinguished into three types, namely the chlorination of polyethylene "in solution", "in suspension" or "in bulk".

Chlorination of polyethylene in solution is known from U.S. Pat. No. 3,060,164.

Chlorination of polyethylene in an aqueous suspension is known from U.S. Pat. No. 2,592,763.

U.S. Pat. No. 2,890,213 describes the chlorination of polyethylene in a fluidized bed, and British Pat. No. 834,905 describes the chlorination of free-flowing polyethylene, in each case in the absence of a liquid suspension agent or solvent, the so-called "chlorination in bulk."

The chlorinated polyethylenes obtained by these different chlorination methods show differences in properties, even if one starts from the same polyethylene material, and chlorinates to the same chlorine content. This appears to be connected principally with the more or less statistical distribution of the chlorine in and along the chlorinated polyethylene polymer chains, as is explained in French Pat. No. 1,316,044 and in British Pat. Nos. 843,209 and 950,374. Chlorinated polyethylenes with a non-statistical distribution of the chlorine atoms possess a much higher glass transition temperaure than do chlorinated polyethylenes having a statistical chlorine distribution, and are also much more rigid, hard and brittle.

A number of disadvantages attach to each of the aforementioned three methods, chlorination in solution, in suspension, or in bulk.

The process of chlorination in solution is expensive. The solubility of polyethylene in organic solvents which are inert to chlorine is relatively small, thus large quantities of solvent are needed. As a rule, expensive polyhalogen hydrocarbons must be used for this purpose. The chlorinated polyethylene product must also be later freed from solvent and removal of the last traces thereof is difficult. The separation itself is cumbersome and expensive.

At relatively low temperatures, the chlorination of polyethylene in suspension does not proceed in a statistical manner. A kind of block copolymer structure, having both chlorinated and non-chlorinated segments in the molecule, appears to be obtained, unless the chlorination is continued for very long times until high chlorine contents result. Although a variety of chlorinated polyethylene products may be produced by suspension chlorination, a number of disadvantages are inherent in a suspension chlorination process. First, effluent from the process is a relatively weak hydrochloric acid which must be substantially removed from the chlorinated polyethylene product. Removal generally requires use of a material such as caustic soda which results in an undesirable salt-containing effluent. Second, the chlorinated polyethylene products so produced must be dried before packaging. A third disadvantage is corrosion of processing equipment due to presence of aqueous mixture of chlorine and hydrochloric acid.

Usually, however, it is desired to obtain a soft and flexible chlorinated polyethylene with a crystallinity of less than about 2 percent. In other words, the chlorinated polyethylene should be fully or at least generally amorphous.

In French Pat. No. 1,316,044, a two-stage process has been described for obtaining generally statistical chlorination of polyethylene. In the two-stage process, the second stage is carried out at a rather high temperature, above the crystalline melting point of the polyethylene. "Crystalline melting point" as used herein means the temperature at which crystallinity disappears as evidenced by disappearance of double refraction, or characteristic X-ray diffraction lines. Preferably, the disappearance of crystallinity is measured by Differential Scanning Calorimetry.

Chlorination in suspension at a high temperature introduces the disadvantage that, at such high temperatures, and even under pressure, chlorine will dissolve to only a very small degree in the suspension agent (which is generally water). Subsequent processing of the product by centrifuging and drying is also expensive. Moreover, the by-product, hydrogen chloride, generally cannot be usefully recovered.

In British Pat. No. 843,209 the differences between chlorinated polyolefins with a statistical and a nonstatistical chlorine distribution are also discussed. Intermediate forms thereof are called hybrid polymers. The hybrid polymers are prepared according to British Pat. No. 843,209 by carrying out the chlorination partly in suspension and partly in solution. However, such a process is very cumbersome. The polyethylene chlorinated in suspension must first be separated from the suspension, and then subsequently dissolved. Only then can the second solution stage be carried out.

Chlorination in bulk, as described in U.S. Pat. No. 2,890,213 and British Pat. No. 834,905, can be carried out at rather high temperatures, with the chlorination reaction proceeding rather rapidly. However, a disadvantage of this method is that the chlorination generally proceeds too fast during the initial phase. Since chlorination is an exothermic reaction, when finely divided polyethylene is chlorinated without a solvent or suspension agent local overheating of the polymer occurs very easily. As a result, reaction speed is locally increased in those places. Local development of heat can in turn cause melting, agglomeration and lump formation, as well as decomposition and even burning of the polymer. These circumstances are also attended by the development of an extremely undesirable discoloration in the product.

Chlorinations partly at temperatures below the crystalline melting point and partly above the crystalline melting point are not only known from French Pat. No. 1,316,044 and British Pat. No. 843,209, but also from U.S. Pat. Nos. 2,398,803; 2,920,064; and British Pat. Nos. 1,073,504 and 1,036,360.

When chlorinating in bulk, it is also difficult to avoid sintering of the ethylene polymer particles to some degree. This forms agglomerates which, in turn, cannot be homogeneously chlorinated. The ethylene polymer also becomes discolored due to hot spots. To avoid such discoloration, it has been proposed that chlorination be carried out at low temperatures to minimize the occurrence of hot spots. The temperatures at which such chlorination is to be carried out, at 60° to 70° Centigrade (°C.), are considerably below the crystalline melting point. Low temperature chlorination must be continued until a certain minimum chlorine content is achieved. Only then can the reaction temperature be increased to a temperature above the crystalline melting point of the polyethylene. If the initial low temperature chlorination has been inadequate, further chlorination at the higher temperature will still lead to development of hot spots, agglomerations and attendant discoloration. However, chlorination at temperatures below the crystalline melting point of the polyethylene for an extended period of time generally results in production of large amounts of hard and brittle chlorinated polyethylene.

To eliminate such objections and disadvantages of the chlorination process in bulk, it has also been proposed to mix the ethylene polymer with inorganic salts, which are then to be washed out after the chlorination. Washing out and recovering, and/or discharging those salts, is, however, expensive, and renders this process economically unattactive.

An additional proposal to eliminate such disadvantages centers around selection of the polymer to be chlorinated. In U.S. Pat. No. 4,029,862, the olefin polymer to be chlorinated is characterized by having a flowability measured as angle of repose in the range of from about 24° to about 28°, a bulk density in the range of from about 25 to about 35 pounds per cubic foot and a surface area in the range of from about 2 to about 4 square meters per gram. The polymer is chlorinated to an extent of up to about 65 percent by weight chlorine using reaction temperatures not exceeding about 80° C. to provide a chlorine content of up to about 30 percent by weight and thereafter maintaining the reaction temperature from about 60° C. to about 100° C. In U.S. Pat. No. 4,197,386 an ethylene polymer starting material has the following combination of characteristics: (i) at most 5 mole percent of at least one $\alpha$-alkene comonomer having from 3 to 8 carbon atoms, particularly propene or butene, (ii) having a density of 0.930–0.970, (iii) a melt index of at most about 5, (iv) a particle size distribution of between about 50 to 2000 microns, (v) a porosity of at most about 0.15 cubic centimeters per gram, (vi) a surface area determined in accordance with the method described in J. Am. Chem. Soc. 60 309 (1938) by Braunauer, Emmet and Teller of at most about 1 square meter per gram and (vii) a wax content of at most about 1 percent by weight.

In view of the foregoing, it is an object of the present invention to provide a process for preparing amorphous chlorinated polyethylenes which are generally soft and flexible yet free of discoloration.

It is also an object of the present invention to provide a non-crystalline, amorphous chlorinated polyethylene having satisfactory properties such as good flexibility and high elongation. Such chlorinated polyethylenes are suitable for use as impact modifiers in polyvinylchloride.

SUMMARY OF THE INVENTION

These and related objects are realized in an anhydrous free radical process for preparing amorphous chlorinated, solid, finely divided polyethylene particles; said process employing a free radical initiator, a flow of gaseous chlorine and agitation of the particles sufficient to expose generally all of said particles to the flow of gaseous chlorine, the process comprising a series of sequential steps:

(a) starting addition of gaseous chlorine to an agitated mass of porous, finely divided polyethylene particles, the particles being exposed to a free radical initiator, while said mass is at a temperature within a temperature range of from about 25° to about 50° Centigrade;

(b) continuing addition of gaseous chlorine to the agitated mass while continuing to expose the mass to a free radical initiator and while increasing the temperature of said mass over a temperature range of from about 50° Centigrade to about 105° Centigrade and maintaining the temperature within said temperature range until a level of chlorination of the agitated mass of from about 5 to about 15 percent by weight of said mass is attained;

(c) continuing addition of gaseous chlorine to the agitated mass while continuing to expose the mass to a free radical initiator and while further increasing the temperature of said mass to a temperature of from about 125° Centigrade to about 132° Centigrade, said temperature being increased at a rate which is sufficiently slow to preclude sintering of the agitated mass; and (d) continuing addition of gaseous chlorine to the agitated mass while continuing to expose the mass to a free radical initiator and while further increasing the temperature of said mass to a temperature which is greater than about 130° Centigrade yet less than a temperature at which sintering of the agitated mass occurs and maintaining said temperature for a period of time sufficient to attain a predetermined level of chlorination and a predetermined level of relative crystallinity.

The amorphous chlorinated, solid, finely divided polyethylenes so prepared unexpectedly have very low blocking values. As used herein, the term "blocking" means the tendency of a powdered chlorinated polymer resin to clump, cake or agglomerate. The low blocking values are obtained without addition of conventional antiblock additives.

DESCRIPTION OF THE PREFERRED EMBODIMENTS

The term "olefin polymer" means polymers of olefins in which the backbone chain of the polymer macromolecule is substantially noncross-linked and nonbranched. The term "olefin polymers" includes polymers of the ethylene, propylene, butene-1 and higher 1-alkenes having 5 to 10 carbon atoms in which polymer the linear main chain has substituent ethylene mer units. As used herein, the term "olefin polymers" is also meant to include homopolymers, copolymers and interpolymers of 1-alkenes and mixtures and blends thereof. The molecular weights of olefin polymers used in the practice of this invention are comparable to those of olefin polymers produced in conventional Ziegler-Natta polymerization processes, e.g., from about 30,000 up to about 3 million or more.

For purposes of this invention, the term "polyethylene" is used to denote preferred olefin polymers and means homopolymers of ethylene and copolymers of ethylene and up to about 5 weight percent of aliphatic $\alpha$-monoolefin or $\alpha$-diolefin having from 2 to 18 carbon atoms. Illustratively, such $\alpha$-olefins can include propylene, butene-1, pentene-1, 3-methylbutene-1, 4-methylpentene-1, hexene-1, octene-1, dodecene-1, octadecene-1, 1,7-octadiene and the like. Such polyethylenes have absolute densities in the range from about 0.90 to about 0.97 grams per cubic centimeter (g/cc), especially from about 0.935 to about 0.967 g/cc. Such polyethylenes also have melt indexes, as determined by the American Society for Testing Materials (ASTM) test D-1238-65T, Condition E (hereinafter ASTM D-1238-65T(E)) in the range of from about 0.01 to about 40 decigrams per minute, especially from about 0.1 to about 12 decigrams per minute and most especially from about 0.15 to about 3 decigrams per minute.

The olefin polymers employed in the practice of this invention are in the form of normally extrudable, free flowing powder having a bulk density in the range of from about 18 to about 35 pounds per cubic foot, especially from about 20 to about 25 pounds per cubic foot. The particles of such powder are generally free flowing, porous particles having individual sizes suitably within the range of from about 40 to about 600 microns, beneficially from about 100 to about 400 microns, and desirably from about 100 to about 200 microns. The powder suitably has a generally uniform, narrow particle size distribution in the range of from about 100 to about 200 microns. It is generally recognized that excessive fines are carried out of a fluidized bed reactor by a fluidizing medium. The particle sizes must, however, not be so large as to result in an undesirably low level of chlorination.

The olefin polymer powders used in the present invention are beneficially made under conditions characteristic of Ziegler polymerization in the presence of a catalyst prepared from an organomagnesium component which does not generally reduce titanium tetrachloride at a temperature of 25° C. The catalyst is prepared in accordance with U.S. Pat. No. 4,244,838, the teachings of which are incorporated herein by reference thereto. A process for preparing olefin polymer powders which employs the catalyst is taught in U.S. Pat. No. 4,246,383, the teachings of which are incorporated herein by reference thereto.

It is understood, however, that other processes capable of producing olefin polymer powders in general, and polyethylene powders in particular, having the aforementioned properties are also suitably employed in the practice of this invention.

For purposes of the present invention, the chlorination of such olefin polymer powders may be effected in various ways. It is possible, for example, to agitate the granular polymer by means of stirring devices while exposing it to the action of a current of chlorine, in the substantial absence of oxygen, wherein the chlorine has preferably been preheated. Various apparatus which are equipped with efficient agitating means may be employed to accomplish such agitation and exposure to chlorine. Illustrative apparatus include reactors having paddle agitators or other agitation means, and rotating cylinders which may be provided with internal mixing baffles other agitation means. The apparatus may be vertically or horizontally disposed, or may be inclined from the horizontal to facilitate a continuous internal passage of solid material therethrough during operation. As an alternative, the material may be thoroughly exposed to the halogen atmosphere and effectively agitated by conducting the reaction according to well-known fluid bed techniques. When using fluid bed techniques, a current of halogen atmosphere is passed through a finely divided and free-flowing layer (fluidized bed) of the material to be halogenated. The passage or forcing of the halogen atmosphere through the fluidized bed is done at a rate sufficient to accomplish a thorough agitation and exposure of the material being halogenated. Any apparatus in which a free-flowing mass of polymer may be thoroughly subjected to a halogen atmosphere at a desired temperature or over a desired temperature range may be suitably employed for conducting the reaction according to the present invention. Fluorine and vaporized bromine, or mixtures of these may advantageously be used in conjunction with gaseous chlorine to constitute the halogen atmosphere of the present invention. Beneficially the halogen atmosphere of the present invention predominantly comprises gaseous chlorine. In certain instances it may be desirable for the halogen atmosphere to contain inert gases and vapors as diluents or carriers. Inclusion of an inert gas may permit a better control over the reaction. In some instances it may also be advantageous to have only portions of the halogen atmosphere diluted when a continuous process is being employed or to have it diluted only during particular intervals in a batch reaction. In this manner, it is possible in the course of a particular halogenation reaction to adjust reaction conditions to suit the changing reactivity, at various halogen contents, of the olefin polymer powder being halogenated.

Any compatible gas or vapor which, under the reaction conditions, is inert to both the halogen atmosphere and the olefin polymer powder being halogenated may be used as a diluent for the halogen atmosphere. Helium and the inert gases, nitrogen, hydrogen halides; and perchloro, perfluoro, or fluoro-chloro hydrocarbons are examples of suitable diluents. Recycling of the hydrogen halide formed during the reaction will also provide a suitable means for diluting the halogen atmosphere. It may sometimes be desirable to externally cool the hydrogen halide formed during the reaction when it is being recycled as a diluent. This may furnish an effective means for controlling the temperature of the reaction within a desired range.

The polymer and the halogen atmosphere are beneficially anhydrous, or dry in the physio-chemical sense. If anhydrous conditions are not maintained, any water which is present will be vaporized and converted to steam. The steam will add pressure to the reactor and will contribute to corrosion problems. Accordingly, reactor design and construction would have to be changed if water were present. In addition, initiation of the chlorination reaction, which will be detailed hereinafter, would be altered if water were present.

Temperatures suitable for halogenation of the olefin polymer powder will vary within limits depending upon a variety of factors and conditions. Temperatures will generally be governed by the mutual reactivity of the particular olefin polymer powder and halogen atmosphere which are being employed and by the extent of halogenation desired. The reactivity of the halogen atmosphere depends directly on the particular halogen or halogens contained therein and, upon effective concentration of said halogen or halogens. The reactivity of the polymer being halogenated is initially fixed by the character of the parent material but may change in the course of a given reaction with a changing halogen content in such polymer. The particle size or shape of the polymer being halogenated may also influence the reaction. Particles having greater surface areas, particularly smaller sized particles or those with crenulated or otherwise irregular configurations, are generally more conducive to a halogenation reaction. The rate of reaction at any given temperature is also largely dependent upon the rate of diffusion of the halogen from the halogen atmosphere into the polymer being halogenated and upon the capacity of the polymer at such temperature to absorb the particular halogen which is involved.

It has been found that amorphous halogenated olefin polymers, specifically amorphous chlorinated polyethylenes, are prepared by a process which involves at least four steps. In a first step, using chlorinated polyethylene by way of example, addition of gaseous chlorine to an agitated mass of porous, finely divided polyethylene particles, the particles being in admixture with an initiator, is started while said mass is at a temperature within a temperature range of from about 25° to about 50° C. It has been found that delaying addition of chlorine until the agitated mass of polyethylene particles has been heated to a temperature greater than about 50° C. produces undesirable results. One of the undesirable results is that the polymer particles cannot be maintained in a fluidized or agitated state. Loss of the fluidized state is evidenced by a caking up of the polymer powder. It has been found that little, if any, halogenation actually takes place during the first step. As hereinabove noted, however, the first step is critical. In a second step, addition of gaseous chlorine to the agitated mass is continued while the temperature of said mass is increased over a temperature range of from about 50° C. to about 105° C. The temperature of the agitated mass is maintained within the temperature range until a level of chlorination of the agitated mass of from about five to about fifteen percent by weight of said mass is attained. It has been found that, with a level of chlorination of less than about five percent by weight, the agitated mass of polyethylene particles tends to agglomerate as chlorination at higher temperatures is attempted. It has also been found that with a level of chlorination of greater than about fifteen percent by weight of said mass in the second step, an undesirably stiff chlorinated polyethylene product results once chlorination is completed. A nominal melting point for polyethylene is 130° C. It has been found that as the polymer is chlorinated, the melting point decreases to a minimum of about 106° C. at a level of chlorination of about 12 percent by weight of chlorinated polymer. As the level of chlorination is increased above about 12 percent by weight of chlorinated polymer, the melting point begins to increase above the minimum. As one exceeds the melting point, sufficient melting of at least surface portions of polymer particles occurs to cause the polymer particles to begin to agglomerate. As a maximum level of chlorination of about fifteen percent by weight of the agitated mass occurs during the second step, the temperature of said mass during the second step should not exceed about 105° C. In a third step, addition of gaseous chlorine to the agitated mass is continued while the temperature of said mass is further increased to a temperature of from about 125° C. to about 132° C. The temperature of said mass is increased at a particular rate which is sufficiently fast to be economical yet sufficiently slow to generally retain a porous particulate structure and to generally prevent sintering of the partially chlorinated polyethylene particles. It has been found that a rate of heating which is too rapid generally results in a chlorinated polyethylene product which is not amorphous after chlorination is terminated. The term "amorphous" as used herein describes a chlorinated polymer having a percent relative crystallinity suitably less than about two percent, beneficially less than about 0.5 percent, desirably less than about 0.3 percent. A rate of heating which is too rapid may also result in agglomeration of the partially chlorinated polyethylene particles. An agglomerated or sintered mass of partially chlorinated polyethylene particles is of no practical use. In light of the foregoing, a suitable rate of heating is from about 0.15° to about 0.36° Centigrade per minute. Beneficially, the rate of heating is from about 0.20° to about 0.36° Centigrade per minute. Desirably, the rate of heating is from about 0.25° to about 0.32° Centigrade per minute. In a fourth step, chlorination of the polyethylene particles is completed. Addition of gaseous chlorine to the agitated mass is continued while the temperature of said mass is further increased to a temperature greater than about 130° C. but less than a temperature at which the particles begin to agglomerate. The temperature must be sufficiently high to produce an amorphous polymer as defined herein by destroying generally all residual crystallinity. The temperature must also be sufficiently low to preclude formation of large lumps or agglomerates of particles. The presence of agglomerates renders a product generally unsuitable for commercial use. It has been found that temperature of up to about 145° C. may be used for the fourth step without detriment. Persons skilled in the art will recognize that temperatures sufficiently in excess of 145° C. will cause the particles to coalesce into one or more large lumps.

Halogen levels of from about 20 to about 50 percent by weight of halogenated polymer may be obtained in accordance with the present invention. Beneficially amorphous chlorinated polyethylenes having a chlorine content, based on chlorinated polymer weight, of from about 25 to about 45 weight percent are obtained. Desirably such chlorinated polyethylenes have a chlorine content of from about 30 to about 42 weight percent. Persons skilled in the art will recognize that chlorinated polyethylene having a chlorine content of 60 weight percent or more will tend to be a glassy material rather than a rubbery material.

Although the rate of halogenation increases with temperature, care should be taken to avoid higher temperatures which may sinter, fuse or char the polymer. When this occurs it becomes more difficult to keep the finely divided polymer in a proper state of agitation and it may cause non-uniformity in the product. In addition, the halogenation reaction is seriously impeded with a sintered polymer because exposed particle surface area is markedly reduced by sintering.

The halogenation reaction of the present invention may be conducted under any suitable pressure. Beneficially, it is carried out at atmospheric pressure. The reaction may, however, be carried out at superatmospheric pressure in order to hasten the rate of reaction. Satisfactory results may also be obtained when the reaction is being conducted under atmospheric pressure by employing a halogen atmosphere which contains amounts of the halogen in excess of stoichiometric requirements. When the reaction is conducted under superatmospheric pressure, care should be exercised to adequately vent by-product materials which are formed in order to maintain an effective halogen level in the halogen atmosphere.

The halogenation reaction of the present invention is suitably carried out in the presence of a free radical initiator. The free radical initiator is suitably selected from the group consisting of chemical free radical forming initiators, free radical forming radiation and a combination of free radical forming radiation and one or more chemical free radical forming initiators.

Free radical forming radiation must have a wavelength sufficient to activate the halogen. In general, suitable results are obtained by employing ultraviolet radiation having a wavelength in the range of from about 3000 to about 4500 Angstroms (Å). Beneficial results have been obtained by using ultraviolet radiation having a wavelength of from about 3350 to about 3650 Å.

Suitable chemical free radical forming initiators are: peroxides and hydroperoxides, for instance benzoylperoxide, diisopropylperoxydicarbonate, benzoylhydroperoxide, cumenehydroperoxide, lauroylperoxide, and the like, azo compounds in particular those with a nitrile group at a carbon atom which is adjacent to an azonitrogen atom, like dimethyl and diethyl, $\alpha,\alpha'$-azodiisobutyronitrile and $\alpha,\alpha'$-azobis($\alpha,\epsilon$-dimethylvaleronitrile). Other known initiators can be used in the process according to the invention.

The following example illustrates the invention but should not be considered as limiting its scope. All parts and percentages are by weight unless otherwise indicated.

General Procedure

A. Ethylene Polymer

In each of the following examples, polyethylene powders having melt index values $I_2$, as determined by ASTM D 1238, Condition E, of 0.1, 0.4, or 11.4 decigrams per minute were, unless otherwise specified, prepared in accordance with U.S. Pat. No. 4,246,383 cited hereinabove. The melt index value $I_2$ of the powder used in each example is set forth in a table which summarizes the examples.

B. Chlorination Apparatus

A 4 inch by 36 inch vertically arranged Pyrex ® glass tube, having a 12 inch portion of the inside thereof adjacent one end (hereinafter the "bottom end") covered with a 1/16 inch sheet of a fluorinated ethylenepropylene fluorocarbon polymer commercially available from E. I. duPont de Nemours and Co. under the trade designation Teflon TM, served as a reactor vessel. A truncated hollow right cylinder conical insert made of polytetrafluoroethylene was fitted into the bottom end of the tube. The conical insert had a large opening and a small opening. The large opening had a diameter of about 4 inches. The large opening was positioned so that it was remote from rather than proximate to the bottom end of the tube. The small opening had a diameter of about 1.3 inches and was positioned so that it was proximate to the bottom end of the tube. Adjacent to the conical insert and arranged so as to cover the bottom end of the tube was a screen assembly. The screen assembly had four layers arranged as follows: (a) a 200 mesh screen of polytetrafluoroethylene; (b) a woven mat made of glass fibers, commercially available from Owens-Corning Fiberglas Corporation under the trade designation Fiberglas TM; (c) a 400 mesh stainless steel screen; and (d) a 20 mesh stainless steel screen. Layer (a) was placed next to the conical insert. A metal funnel, having the larger opening adjacent layer (d) of the screen assembly was connected to the bottom end of the tube. The stem or smaller opening of the funnel was connected to a gas supply line which in turn was connected to an overpressure relief valve set at 50 pounds per square inch, a gaseous chlorine supply line and a gaseous nitrogen supply line. By a suitable arrangement of check valves and blocking valves, a ratio of gaseous chlorine to gaseous nitrogen could be established. The gaseous nitrogen supply line had incorporated therein an electrical heater for the gaseous nitrogen. A set point controller was used to maintain the temperature of the nitrogen at a manually selected temperature. One thermocouple was placed inside the tube near the screen assembly to measure powder temperature. A second thermocouple was placed inside the metal funnel to measure inlet temperature of the nitrogen gas or nitrogen/halogen gas mixture. A cap connected to a scrubber was fitted with a second end of the tube (hereinafter referred to as the "top end").

C. Procedure

A sample of the ethylene polymer powder to be chlorinated was placed into the reactor vessel. The powder was then made free of oxygen by passing a dry and pure gaseous nitrogen stream through the reactor vessel until the powder was heated to temperature of about 40° C. Heating of the reactor vessel and the polymer powder contained therein was accomplished by heating the nitrogen stream. The flow of nitrogen gas, regulated at 2.0 cfm, was sufficient to fluidize the polymer powder. Gaseous chlorine was added to the gaseous nitrogen during heating of the polymer powder from a temperature of about 25° C. to about 50° C. The polymer powder temperature at which gaseous chlorine was introduced into the reactor vessel is hereinafter set forth in the table. A nitrogen to chlorine ratio of 10:1 was used unless otherwise specified. The final temperature is hereinafter specified unless chlorination was terminated prior to reaching the final temperature. After chlorination was completed, ambient temperature gaseous nitrogen was passed through the polymer powder until the polymer powder was at a safe handling temperature of less than about 80° C. The powder was then removed from the reactor.

D. Polymer Property Tests

Melt Index - $I_2$ - Melt index in decigrams/minute as determined respectively by ASTM Test No. D-1238-64T, Condition E.

Crystallinity - percent relative crystallinity.

EXAMPLES 1-17

TABLE I

| Example No. | Polyethylene Melt Index | Cl₂ Start Temp. °C. | Total Reaction Time Hrs/min | Rate Temp Increase in Stage 3 °C./min | Stage Max temps °C. 2 | 3 | 4 | % Cl₂ | % Cryst | Remarks |
|---|---|---|---|---|---|---|---|---|---|---|
| **1 | 0.4 | 65/49 | 7/0 | 0.3 | 97 | 130 | 130 | 33.9 | <0.1 | some black specks, no lumps, see Note 1 |
| **2 | 0.4 | 25 | 5/45 | 0.33 | 99 | 131 | 131 | 37.5 | <0.1 | |
| **3 | 0.1 | 26 | 5/15 | 0.3 | 100 | 128 | 129 | 35.1 | <0.5 | |
| **4 | 0.4 | 40 | 5/20 | 0.36 | 101 | 130 | 131 | 36.5 | <0.1 | |
| **5 | 0.1 | 33 | 4/58 | 0.25 | 96 | 129 | 129 | 39.5 | <0.3 | |
| 6 | 0.4 | 41 | 1/30 | — | 75 | — | 98 | 13.8 | * | no lumps |

TABLE I-continued

| Example No. | Polyethylene Melt Index | Cl₂ Start Temp. °C. | Total Reaction Time Hrs/min | Rate Temp Increase in Stage 3 °C./min | Stage Max temps °C. 2 | 3 | 4 | % Cl₂ | % Cryst | Remarks |
|---|---|---|---|---|---|---|---|---|---|---|
| 7 | 0.4 | 71 | 0/38 | — | 75 | — | 98 | * | * | fluidization lost |
| 8 | 0.4 | 44 | 1/30 | — | 86 | — | 75 | * | * | N₂ contaminated w/120 ppm O₂ |
| 9 | 0.4 | 40 | 5/10 | 0.43 | 99 | 129 | 129 | * | ~5 | no specks or lumps |
| 10 | 0.4 | 33 | 5/35 | 0.7 | 99 | 132 | 130 | ~35 | ~10 | fast third stage |
| **11 | 0.1 | 40 | 3/18 | 0.3 | 99 | 132 | 132 | 34.3 | ~2 | |
| **12 | 0.1 | 42 | 4/0 | 0.25 | 101 | 129 | 129 | 37.3 | ~1 | |
| **13 | 0.1 | 37 | 4/10 | 0.29 | 96 | 126 | 127 | 36.9 | ~2 | temp profile |
| 14 | 11.4 | 42 | 3/14 | 0.43 | 93 | 128 | 146 | * | * | one big lump |
| 15 | 11.4 | 31 | 2/0 | * | 105 | — | 105 | * | * | trouble controlling temperature and fluidization |
| 16 | 0.1 | 33 | * | * | 96 | — | 110 | * | * | See Note 2 |
| 17 | 11.4 | 37 | 4/45 | 0.30 | 90 | 120 | 136 | 35.4 | 0.12 | |

*not measured
**the invention

Note 1 The flow of gaseous chlorine was started at 65° C. The powder caked up and fluidization was lost. After the caked powder was cooled to a temperature of about 49° C., it returned to a free-flowing powder state. The flow of gaseous chloride was then restarted.

Note 2 The purpose of this example was to evaluate the effect of blocking ultraviolet light from the reactor. This was done by wrapping the reactor vessel in aluminum foil. Chlorination ceased while the reactor was wrapped in aluminum foil. Upon removal of the foil, chlorination started. Rewrapping the reactor in foil caused cessation of chlorination.

A review of the preceding examples 1-17 is instructive because it shows the necessity (a) of maintaining a generally oxygen-free atmosphere (Example 8), (b) of starting addition of chlorine gas at a temperature of less than 50° C. (Example 7), (c) of maintaining a proper rate of temperature increase in stage 3 (Example 10) and (d) of the presence of ultraviolet light to catalyze the chlorination reaction (Example 16). Similar results are obtained with other olefin polymer powders and with other halogens or halogen mixtures in accordance with the present invention.

Blocking Test

In the blocking test, an attempt is made to form a tablet or cake by compressing a 50 gram quantity of powdered chlorinated polyethylene resin in a mold. The tablet, if formed, is then pressed with a sharp edge of a wedge until the tablet is ruptured. A measure of the relative force required to rupture the tablet provides an indicator of the tendency of a resin to block.

Results of Blocking Test

A portion of the polymer prepared in Example 1 was placed into the mold and compressed. The tablet so formed returned to granular form on removal from the mold. Accordingly, the polymer of the present invention had a relative blocking value of zero. A slurry chlorinated polyethylene (36 percent by weight chlorine) compounded with conventional antiblock additives had a relative blocking value of about 25. The same polymer without antiblock additives had a relative blocking value in excess of ten times that of the polymer compounded with antiblock additives. This relatively simple test clearly demonstrates that a reduced blocking tendency is available from the process of the present invention. Similar beneficial results are obtained with other chlorinated polyethylene resins prepared in accordance with the present invention.

What is claimed is:

1. An anhydrous free radical process for preparing amorphous chlorinated, solid, finely divided polyethylene particles; said process employing a free radical initiator, a flow of gaseous chlorine and agitation of the particles sufficient to expose generally all of said particles to the flow of gaseous chlorine, the process comprising a series of sequential steps:

(a) starting addition of gaseous chlorine to an agitated mass of porous, finely divided polyethylene particles, the particles being exposed to a free radical initiator, while said mass is at a temperature within a temperature range of from about 25° to about 50° Centigrade;

(b) continuing addition of gaseous chlorine to the agitated mass while continuing to expose the mass to a free radical initiator and while increasing the temperature of said mass over a temperature range of from about 50° Centigrade to about 105° Centigrade and maintaining the temperature within said temperature range until a level of chlorination of the agitated mass of from about 5 to about 15 percent by weight of said mass is attained;

(c) continuing addition of gaseous chlorine to the agitated mass while continuing to expose the mass to a free radical initiator and while further increasing the temperature of said mass to a temperature of from about 125° Centigrade to about 132° Centigrade, said temperature being increased at a rate which is sufficiently slow to preclude sintering of the agitated mass; and (d) continuing addition of gaseous chlorine to the agitated mass while continuing to expose the mass to a free radical initiator and while further increasing the temperature of said mass to a temperature which is greater than about 130° Centigrade yet less than a temperature at which sintering of the agitated mass occurs and maintaining said temperature for a period of time sufficient to attain a predetermined level of chlorination and a predetermined level of relative crystallinity.

2. The process of claim 1 wherein an inert fluidizing gas is added in conjunction with the gaseous chlorine.

3. The process of claim 1 wherein the free radical initiator is suitably selected from the group consisting of chemical free radical forming initiators, free radical forming radiation and a combination of free radical forming radiation and one or more chemical free radical forming initiators.

4. The process of claim 1 wherein the free radical initiator is free radical forming radiation.

5. The process of claim 1 wherein a level of chlorination of from about 20 to about 50 percent by weight of polymer is attained.

6. The process of claim 1 wherein a level of chlorination of from about 30 to about 42 percent by weight of polymer is attained.

7. The process of claim 2 wherein the inert fluidizing gas is selected from the group consisting of nitrogen and hydrogen chloride.

8. The process of claim 3 wherein the free radical forming radiation is provided by ultraviolet light having a wavelength sufficient to activate chlorine.

9. The process of claim 8 wherein the ultraviolet light has a wavelength of about 3350 to about 3650 Angstroms.

10. The process of claim 1 wherein the rate of temperature increase in step c is from about 0.25° to about 0.36° Centigrade per minute.

11. An anhydrous free radical process for preparing amorphous chlorinated, solid, finely divided polyethylene particles, said process employing free radical forming radiation, a flow of gaseous chlorine and agitation of the particles sufficient to expose generally all of said particles to the flow of gaseous chlorine, the process comprising a series of sequential steps:

(a) starting addition of gaseous chlorine to an agitated mass of porous, finely divided polyethylene particles, the particles being exposed to free radical forming radiation, while said mass is at a temperature within a temperature range of from about 25° to about 50° Centigrade;

(b) continuing addition of gaseous chlorine to the agitated mass while exposing said mass to free radical forming radiation, and while increasing the temperature of said mass over a temperature range of from about 50° Centigrade to about 105° Centigrade and maintaining the temperature within said temperature range until a level of chlorination of the agitated mass of from about 5 to about 15 percent by weight of said mass is attained;

(c) continuing addition of gaseous chlorine to the agitated mass while exposing said mass to free radical forming radiation and while further increasing the temperature of said mass to a temperature of from about 125° Centigrade to about 132° Centigrade, said temperature being increased at a rate of from about 0.25° to about 0.32° Centigrade per minute said rate being sufficiently slow to preclude sintering of the agitated mass; and (d) continuing addition of gaseous chlorine to the agitated mass while exposing said mass to free radical forming radiation and while further increasing the temperature of said mass to a temperature which is greater than about 130° Centigrade yet less than a temperature at which sintering of the agitated mass occurs and maintaining said temperature for a period of time sufficient to attain a level of chlorination of from about 30 to about 42 percent by weight of said mass and a level of relative crystallinity of less than about 2 percent.

12. The process of claim 11 wherein the free radical forming radiation is provided by ultraviolet light having a wavelength of from about 3350 to about 3650 Angstroms.

* * * * *